United States Patent [19]

Boucher

[11] Patent Number: 4,644,788
[45] Date of Patent: Feb. 24, 1987

[54] MODULAR MARINE INSTRUMENT
[75] Inventor: Stephen G. Boucher, Amherst, N.H.
[73] Assignee: Airmar Technology Corporation, Amherst, N.H.
[21] Appl. No.: 805,963
[22] Filed: Dec. 6, 1985
[51] Int. Cl.[4] ........................................... G01G 21/10
[52] U.S. Cl. .................................... 73/187; 324/167; 324/174
[58] Field of Search ........................ 73/187, 185, 189; 324/173, 174, 167

[56] References Cited

U.S. PATENT DOCUMENTS

| Re. 28,839 | 6/1976 | Overs | 73/187 |
|---|---|---|---|
| 128,324 | 6/1872 | Pierce | |
| 3,287,969 | 11/1966 | Hardy | 73/187 |
| 3,400,582 | 9/1968 | Warner | 73/181 |
| 3,433,065 | 3/1969 | Mergler | 73/187 |
| 3,457,782 | 7/1969 | Maeder et al. | 73/187 |
| 3,496,770 | 2/1970 | Fassett, II | 73/187 |
| 3,531,988 | 10/1970 | Casani et al. | 73/187 |
| 3,548,654 | 12/1970 | Cole, Jr. | 73/187 |
| 3,706,224 | 11/1972 | Overs | 73/187 |
| 4,038,870 | 8/1977 | Rotier | 73/181 |
| 4,110,727 | 8/1978 | Kriege | 340/10 |
| 4,206,637 | 6/1980 | Pankonien | 73/187 |
| 4,324,135 | 4/1982 | Peyton | 73/187 |
| 4,555,938 | 12/1985 | Boucher et al. | 73/187 |

FOREIGN PATENT DOCUMENTS 7904540 9/1980 France ............................ 73/187

Primary Examiner—Donald O. Woodiel
Attorney, Agent, or Firm—Hamilton, Brook, Smith & Reynolds

[57] ABSTRACT

A modularized marine instrument sensing device is described wherein a paddlewheel assembly for providing an electromagnetic signal proportional to marine vessel speed is separably mountable on retaining members provided in a sensor housing. The sensor housing may house a Hall-effect device which converts the varying magnetic field from the paddlewheels to an electrical signal proportional to vessel speed. The sensor housing may also incorporate a piezoelectric transducer for providing a depth sounding and fish finding function. Optionally, the paddlewheel assembly may include a temperature sensing device, such as a thermistor, within a frame assembly which incorporates locking tabs and engagement pins which cooperate with the retaining members on the sensor housing.

11 Claims, 4 Drawing Figures

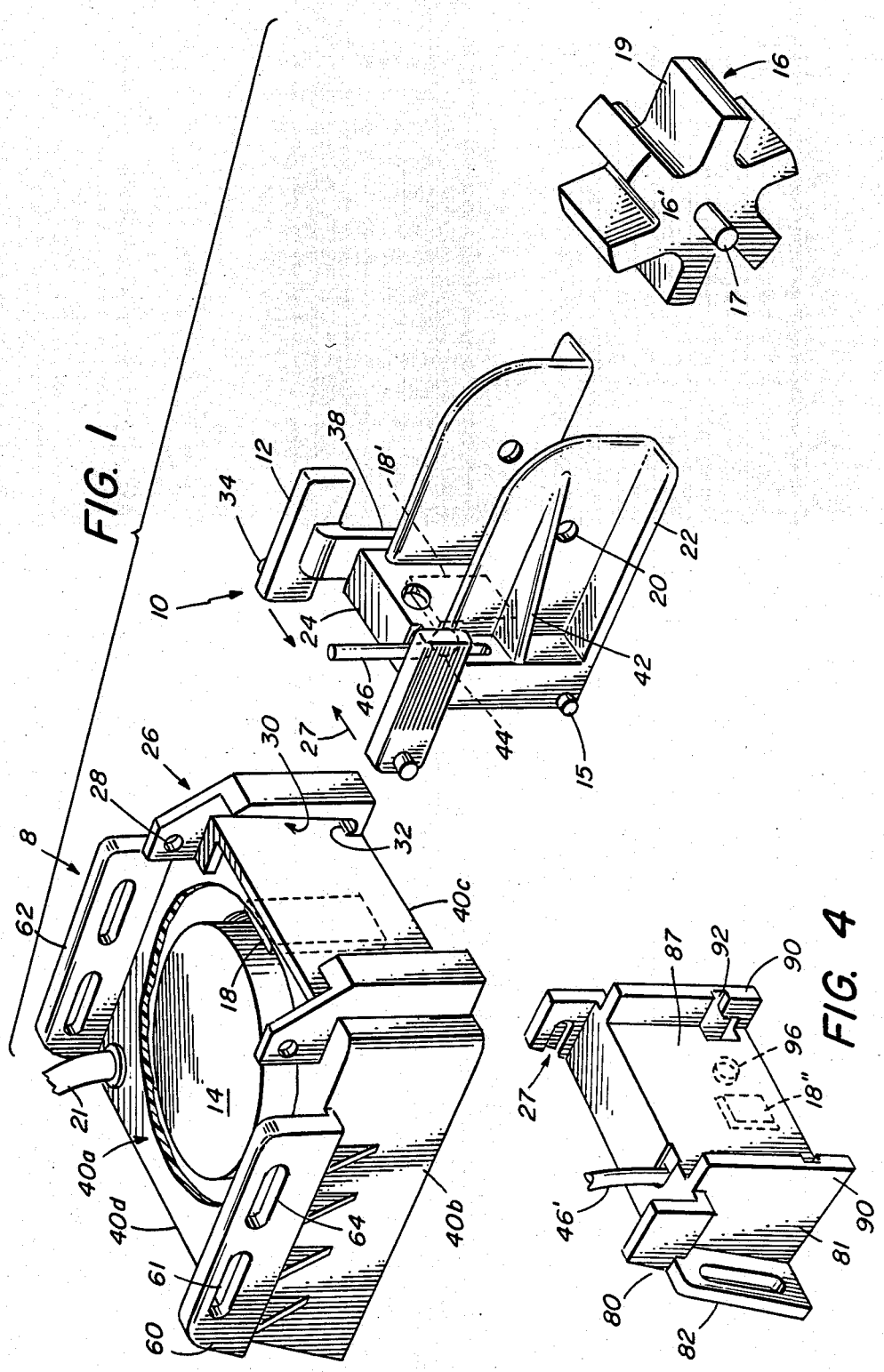

MODULAR MARINE INSTRUMENT

TECHNICAL FIELD

This invention is in the field of marine instrumentation for providing information with respect to the speed of a marine vehicle through water, and optionally, with respect to the depth and temperature of the water.

BACKGROUND ART

Instruments for measuring and displaying speed or velocity of a marine vessel through water have utilized a wide variety of sensors (See, for example, U.S. Pat. No. 4,206,637—paddlewheel interrupts photodetector; U.S. Pat. Nos. 3,531,988; 3,496,770; 3,457,782—paddlewheel with magnet on each paddle or paddle made of magnetic field permeable material which is sensed by electromagnetic pick-up coil; and U.S. Pat. No. 3,706,224—paddlewheel with magnet on each paddle which interrupts current flow in a circuit).

Similarly, numerous instruments exist for providing sonic signals for depth sounding or fish locating. (See, for example, U.S. Pat. No. 4,110,727 and various references cited therein.)

It has also been found helpful for marine navigation and fish finding to measure water temperature by various means.

For the most part, prior art speedometers are mounted through the hull of the vessel requiring the drilling of a large hole in the hull and the attendant sealing problems (See the knotmeter of U.S. Pat. No. 3,531,988). Additionally, with the exception of the transom mounted speedometer, it is customary to completely enclose the paddlewheel speed sensor except for a small portion in which the paddle extends into the water (See U.S. Pat. No. 3,457,782, for example). In such "closed cavity" devices, the speed sensor becomes non-linear at higher speeds of, for example, in excess of 35 miles per hour.

U.S. Pat. No. 4,555,938 discloses a marine device which combines in one integral unit the functions of speed sensing, water temperature sensing and depth or fish sounding. In the apparatus of U.S. Pat. No. 4,555,938, a sensor housing is provided for enclosing (1) a sonic transducer assembly, (2) a temperature sensor comprising a thermistor, and (3) a solid state electromagnetic sensor comprising a Hall-effect device. The housing consists of a top end wall and four side walls. The forward wall is angularly inclined from top to bottom at an angle of about 20 degrees to conform to the inclination of the transoms of some vessels and to enable mounting the housing on such transoms. Support members comprising planar struts are fixedly attached to the aft wall opposite the inclined wall. An impeller, or paddlewheel, is rotatably supported from the struts such that only a portion of the paddles extends below the struts.

The paddlewheel, or impeller, is formed of amorphous magnetic material and the blades are magnetized to provide alternate North-South poles. As the marine vessel moves through water, the paddlewheel rotates at a rate proportional to the velocity of the vessel. A Hall-effect device mounted inside the housing adjacent the support members senses the change in electromagnetic field, as the polarized rotating paddlewheels pass by, and generates an electrical signal, the frequency of which is proportional to vessel speed.

A sonic transducer is centrally located inside the housing and is provided with a metallic coaxial shield enclosure between it and the Hall-effect speed sensing device to prevent reciprocal interference between the signals generated by the Hall-effect device and the sonic transducer. The metallic shield is also interposed between the sonic transducer and the wall mounted temperature sensor, thereby similarly reducing mutual interference between the two devices. Electrical leads running from the sonic transducer, Hall-effect device, and thermal sensor are coupled to appropriate interface circuitry and display devices on the vessel over a shielded cable through an opening in the end, or top, wall of the sensor housing. This apparatus, for the most part, has fulfilled the needs of the industry. Nevertheless, because of its integrated construction, certain problems in use have arisen, thereby creating a need for improvement.

DISCLOSURE OF THE INVENTION

Among the difficulties associated with the device of U.S. Pat. No. 4,555,938, the following are of specific relevance:

1. Some purchasers, at least initially, do not want to include all three functions of speed, depth and temperature, in one purchase.

2. The paddlewheel of the speed sensor tends to become fouled by seaweed and other material and requires relatively frequent cleaning. Cleaning has to be accomplished in place or the entire assembly must be removed from the transom for cleaning; an annoying and time consuming procedure in either case.

3. Because the paddlewheel portion of the device projects outwardly, it is subject to a great deal of abuse and can be readily broken, in which case, the entire unit must be replaced.

These and other disadvantages of the prior art devices have been overcome by the apparatus of the present invention. In the present invention, the paddlewheel is incorporated into a separable paddlewheel assembly, which may optionally include a housing for the temperature sensing function and/or the Hall-effect electromagnetic sensor.

This paddlewheel assembly is adapted to mate with a sensor housing or, optionally, a bracket assembly. The sensor housing may include, either or both, an electromagnetic sensor and depth sounding means.

The sensor housing and/or bracket assembly includes a suitable bracket for fixedly mounting the housing or assembly on the transom. Additionally, at the aft end of the housing, a pair of retaining members with oppositely disposed elongate guide rails and pivot holes are provided.

The separable paddlewheel assembly comprises a pair of struts extending from a frame member and a magnetic paddlewheel rotatably mounted between the struts for generating a patterned electromagnetic which extends from the paddlewheel to the electromagnetic sensor. As the paddlewheel rotates in the water, in response to movement of the marine vessel, the rotational speed is sensed by the electromagnetic sensor in the housing and an electrical signal is generated proportional thereto, which is displayed on a suitable meter in the vessel.

The frame member may include a partially enclosed section for mounting the electromagnetic sensor and/or a temperature sensor. A pair of locking tabs are located adjacent the upper end of the frame. Each tab has locking pivot members extending laterally therefrom. The tabs are formed on elongate flexible arms. The arms are spaced laterally from, and joined at one end, to the frame member.

A pair of engagement pins are formed in the lower portion of the frame projecting laterally therefrom. These engagement pins mate with the slide rails in the sensor housing to position the paddlewheel assembly in alignment with the aft wall of the housing.

The paddlewheel assembly may be readily mounted on the housing by positioning the assembly above the housing guide rails and sliding the assembly down between the guide rails with the engagement pins projecting into the rails and compressing the tabs inwardly until the pins reach the bottom of the guide rails. In this position, the pivot members on the tabs are aligned with the pivot holes on the housing. When the tabs are released from the compressive force, they are restored or displaced outwardly and the pivot members on the tabs engage the pivot holes, locking the paddlewheel assembly in place adjacent the electromagnetic sensor.

The reverse process enables the paddlewheel assembly to be readily removed from above for cleaning or replacement. Furthermore, should the paddlewheel assembly be subjected to excessive undesired external forces (for example, by striking an object), the engagement pins are apt to break before the rest of the assembly releasing the assembly for upward pivotal rotation. Thus, at most, only the paddlewheel assembly need be replaced in such event.

Additionally, by in effect modularizing or separating the paddlewheel assembly from the sensor housing, it becomes possible to offer customers a greater variety of options using standard parts. For example, a customer may want to initially purchase a sensor system having only the depth sounding and speed sensing functions with an option to later include temperature sensing. The temperature sensing feature may be conveniently added by removing the "standard" paddlewheel assembly and replacing it with an assembly in which the temperature sensor and wiring is enclosed in the frame of the "standard" paddlewheel assembly.

These and other advantages of the present invention will be described in greater detail in connection with the drawings.

BRIEF DESCRIPTION OF THE DRAWINGS

FIG. 1 is an exploded partially cut-away perspective view of a preferred embodiment of the invention.

FIG. 4 is a rear perspective view of the housing member 80 of FIGS. 2 and 3.

BEST MODE OF CARRYING OUT THE INVENTION

Figure 3:
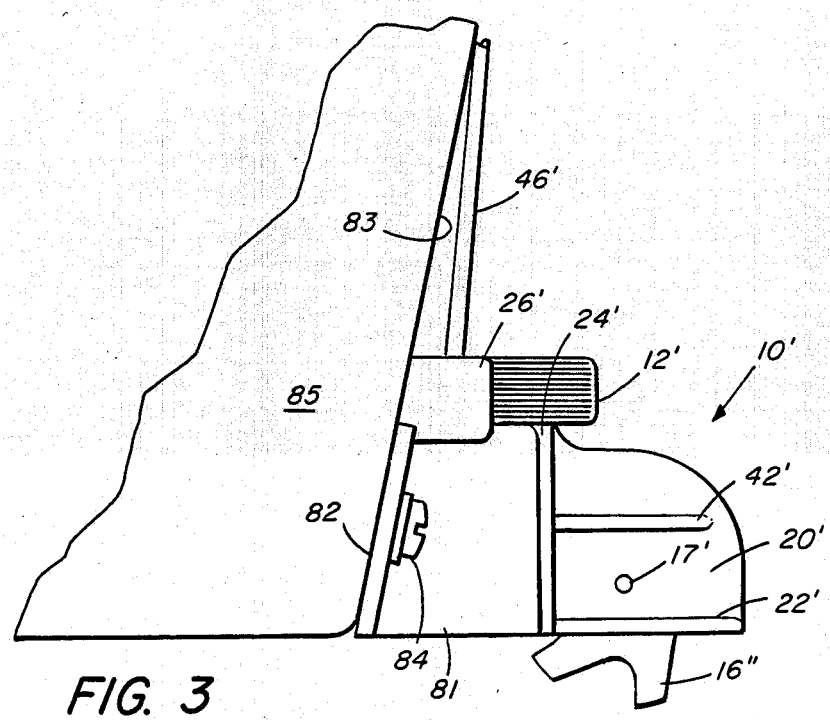
FIG. 3 is a side elevational view of the embodiment of FIG. 2 taken along the lines 3—3.

Referring to FIG. 1, the apparatus of the invention may be seen to comprise, in general, two separable components; a sensor housing, shown generally at arrow 8, and a rotatable paddlewheel assembly, shown generally at arrow 10.

The paddlewheel assembly comprises paddlewheel 8 rotatably mounted between a pair of struts 20 attached to a frame 24. The struts are reinforced by ribs 42. A pair of planar feet, or tabs, approximately 5/16 inches wide, extend laterally from struts 20. These feet, or tabs, provide improved linearity by reducing the tendency of the paddlewheel to slip rather than rotate under speed.

Preferably, an electromagnetic sensing device 18 is mounted on the inner aft wall of sensor housing 8 between a pair of external retaining members 26.

Sensor housing 8 is comprised of electromagnetically permeable material, such as polycarbonate. The housing is formed with a top wall 40a and four side walls: forward side wall 40d, aft side wall 40c and side walls 40b and 40e (not shown).

Forward wall 40b is inclined at an angle of about 20° from top to bottom so as to enable convenient mounting of the sensor housing 8 onto the transom of a marine vessel, some of which have similarly inclined transoms.

Bracket member 60 and 62 are affixed to side walls 40b and 40e, respectively. These members are provided with apertures 64 and 66, to which mounting brackets (not shown) may be secured for mounting the housing onto the transom.

A sonic transducer assembly 14 is centrally mounted within the walls of the housing 8. The sonic transducer assembly 14 comprises a copper or other electrically conductive material forming an electromagnetic shield cup about a piezoelectric transducer (not shown). The piezoelectric transducer consists of piezoelectric device which, upon being provided with an appropriate alternating electric signal, produces a mechanical vibratory force which is transmitted into the water and, upon return of this signal, the transducer converts the mechanical vibratory signal into a corresponding electrical signal, which may be displayed on an appropriate meter provided on the vessel.

Suitable electrical leads are provided within cable 21 for coupling the transducer 14 and electromagnetic sensor 18, to display devices (not shown) provided in the vessel.

The paddlewheel 16 consists of a hub portion 16' from which extend six paddles 19. The paddlewheel is formed of amorphous magnetic material, such as barium ferrite, by an injection molding process. After formation of the paddlewheel 16, the paddles 19 may be electromagnetically polarized in a magnetic field, such that the polarity of the six paddles at the tip alternates from north to south.

As the paddles rotate about the shaft 17, the variation in electromagnetic field caused by the polarity changes, is sensed by the Hall-effect device 18 mounted on the interior aft wall 40c of the sensor housing 8. In operation, the paddlewheel 16 is adapted to be mounted on the transom of a vessel in a position such that the paddles 19 pierce the surface of the water when the vessel is planing. Also, the paddlewheel is open at the aft, top, and bottom sides. Therefore, the impeller blades or paddles are not required to move water around in an enclosed cavity. This greatly improves the linearity of the speed sensor at relatively high speeds by avoiding cavitation which occurs in enclosed paddlewheel constructions.

As the paddlewheels rotate past Hall-effect device 18, an alternating voltage signal is generated. The frequency of the voltage signal is directly proportional to the rotational speed of the paddle-wheel and therefore to the velocity of the vessel.

In accordance with the present invention, paddlewheel housing 10 is adapted to be separably mounted onto sensor housing 8 for convenience of removal for replacement or cleaning purposes. This separability is achieved by the interrelationship between the retaining members 26 on the housing and the locking tabs 12 and engagement pins 15 on the frame 24 of paddlewheel assembly 10.

A pair of retaining members 26 with oppositely disposed elongate guide rails 30 are integrally formed, such as by molding, on the aft wall 40c of sensor housing 8. Oppositely disposed pivot holes 28 are formed, as by molding or drilling holes, on the upper portion of the side walls of retaining members 26. Correspondingly, paddlewheel assembly 10 is provided with a pair of locking tabs 12 having pivot members 34 in the form of laterally extending projections. The locking tabs 12 are integrally formed on elongate flexible arms 38. The arms 38 are spaced laterally from, and joined at one end to a frame member 24. Frame member 24 provides integral support for the struts 20 and may also provide a housing for an optional thermistor device 44 which provides water temperature sensing signals which may be optionally coupled to a meter on the vessel via cable 46.

A pair of engagement pins 15 are provided at opposite sides of frame member 24 below locking tabs 12. These engagement pins are adapted to mate with the guide rails 30 in such a manner that the paddlewheel assembly 10 is maintained in a vertically aligned position adjacent sensor 18, such that when the engagement pins 15 bottom on the bottom walls 32 of retaining members 26, the locking pins 34 on tabs 12 are laterally adjacent the pivot holes 28 on the retaining members 26.

Thus, as may be seen from the above description, the paddlewheel assembly 10 may be readily mounted on the housing 8 by positioning the assembly 10 above the housing guide rails 30 and sliding the assembly down between the guide rails with the engagement pins 15 projecting into the rails while, at the same time, compressing the tabs 12 inwardly in the direction of the arrows 27.

When the engagement pins 15 reach the bottom wall 32 of the guide rails, the pivot members 34 on the tabs 12 are aligned with the pivot holes 28 on the retaining members 26. At this point, the tabs 12 may be released whereupon they will spring back to their normally uncompressed position and engage the pivot holes 28, thereby locking the paddlewheel assembly 10 in place in an aligned vertical position adjacent to the aft wall 40c and the electromagnetic sensor 18 mounted on the interior of the aft wall 40c.

By performing the reverse process, the paddlewheel assembly 10 may be readily removed by a person, from above, for cleaning or replacement purposes. It should also be noted that in the event the paddlewheel assembly is subjected to excessive forces, especially in the rearward direction (for example, by striking an object in the water), the engagement pins 15, which are of relatively little shear strength, tend to break before the remainder of the assembly, thereby releasing the assembly upward, for pivotal or rotational movement about the axis of the pivot members 34.

Thus, in most situations, only the paddlewheel assembly will be damaged and require replacement. Also, by modularizing or separating the paddlewheel assembly 10 from the sensor housing 8, it becomes possible to offer customers a variety of options using standard interchangeable parts. For example, a customer may desire to initially purchase a sensor system with only the depth sounding and speed sensing functions, while retaining an option to, at some later time, include temperature sensing. The temperature sensing function may be conveniently added by removing a standard paddlewheel assembly 10 and replacing it with an assembly in which a temperature sensor, such as a thermistor 44, is included within the frame member 24, along with suitable wiring 46 to couple the temperature sensing signal to a meter on the vessel.

Alternatively, the customer may opt to purchase a sensor housing 8 with only the depth sounding function provided in the form of transducer 14, without including a paddlewheel assembly 10 or an electromagnetic sensor 18. In this event, the speed sensing and/or temperature sensing function may be incorporated into the housing of frame 24 and an electromagnetic sensor 18' may be mounted on the aft wall of frame 24, as shown in dotted lines in FIG. 1.

Figure 2:
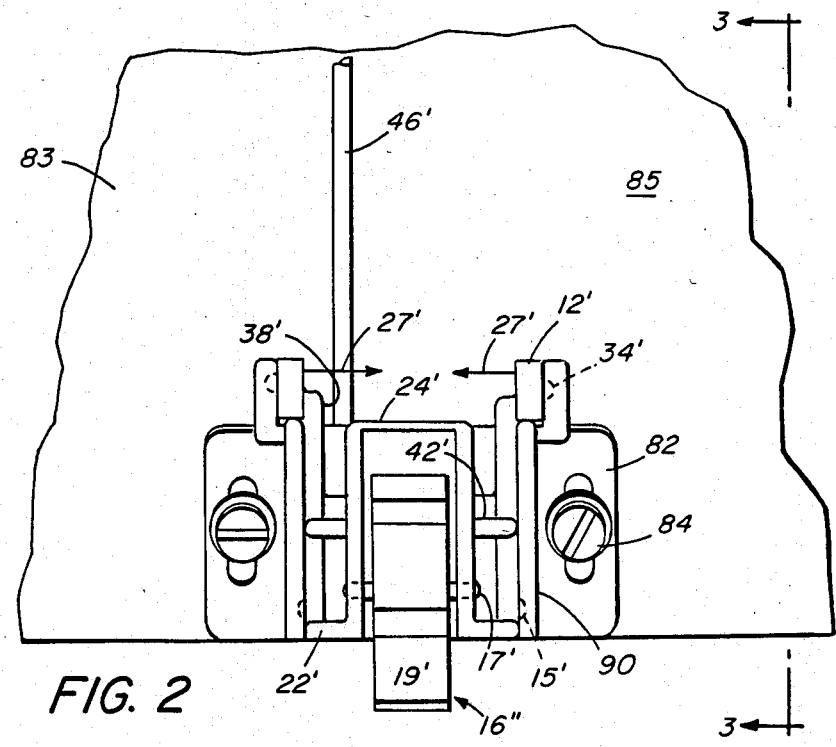
FIG. 2 is a rear elevational view of an alternate embodiment of the invention.

More likely, in the event the depth sounding function is not desired, but speed sensing is, the alternate embodiment of FIGS. 2, 3 and 4 shows an attractive alternative. In this embodiment, a foreshortened housing assembly in the form of a walled member 80 is provided in place of housing 8 of FIG. 1. (Note, like numerals are retained in FIGS. 2, 3 and 4 for corresponding parts in FIG. 1 with a prime suffix added.) In this embodiment, the member 80 provides a mounting structure for fastening the sensor assembly to the hull of the vessel. No depth sounding transducer is intended to be housed in member 80 but an electromagnetic sensor 18" is attached to the aft wall 87 of member 80.

Member 80 comprises a walled structure with two opposite side walls, one of which is shown at 81, a bottom wall and an aft wall 87. Planar mounting brackets 82 extend from the front portion of each side wall and carry fastener means, such as screws 84, for mounting the member 80 on the transom 83 of hull 85.

A pair of supports 90 with oppositely disposed elongate guide rails 92 are integrally formed, such as by molding, on the aft wall of member 80. Oppositely disposed slotted pivot holes 27 are formed, as by molding or drilling holes, on the upper portion of the side walls of member 80.

Correspondingly, paddlewheel assembly 10' is provided with a pair of locking tabs 12' having pivot members 34' in the form of laterally extending projections. The locking tabs 12' are integrally formed on elongate flexible arms 38'. The arms 38' are spaced laterally from, and joined at one end to a frame member 24'. Frame member 24' provides integral support for the struts 20'.

A pair of engagement pins 15' are provided at opposite sides of frame member 24' below locking tabs 12'. These engagement pins are adapted to mate with the guide rails 92 on supports 90 in such a manner that the paddlewheel assembly 10' is maintained in a vertically aligned position, such that when the engagement pins bottom on the bottom walls of rails 92, the locking pins 34' on tabs 12' are laterally adjacent corresponding pivot holes 27 on member 80.

The electromagnetic sensor 18", which provides speed sensing signals, is mounted on aft wall 87 adjacent paddlewheel 16".

Thus, as may be seen from the above description, the paddlewheel assembly 10' may be readily mounted on member 80 by positioning the paddlewheel assembly 10 above the rails 92 and sliding the paddlewheel assembly in and down between the guide rails with the engagement pins projecting into the rails while, at the same time, compressing the tabs 12' inwardly in the direction of the arrows 27'.

When the engagement pins reach the bottom wall of the guide rails, the pivot members 34' on the tabs 12' are aligned with the pivot holes 27 on the member 80. At this point, the tabs 12' may be released whereupon they will spring back to their normally uncompressed position and engage the pivot holes, thereby locking the paddlewheel assembly 10' in place in an aligned vertical position. By performing the reverse process, the paddlewheel assembly 10' may be readily removed.

Optionally, a thermal sensor 96 may be mounted, as shown in FIG. 4, on the inner aft wall 87 and the signals from sensors 96 and 18" coupled through cable 46' to instruments on the vessel.

EQUIVALENTS

This completes the description of the preferred embodiments of the invention. It should be understood that the invention is not to be limited to the specific embodiments set forth herein, but only by the scope of the following claims, which should be provided with the full range of equivalency to which such claims are entitled.

For example, the locking members need not necessarily be pivotal, but may be formed of dovetailed non-pivotal members.

I claim:

1. Apparatus for mounting a speed sensor to a marine vessel, said sensor of the type comprising a magnetized paddlewheel for providing electromagnetic signals proportional to the rotational speed of said paddlewheel to be sensed by an electromagnetic sensor responsive to said electromagnetic signals and comprising:
   (a) a walled member with bracket means on said member for mounting said member on the exterior of the vessel;
   (b) a paddlewheel assembly for separable mounting on said member comprising:
      i. a pair of struts extending from a frame member,
      ii. a pair of compressable tabs extending from said frame member, said tabs including locking means for locking said assembly onto said walled member,
      iii. engagement means on said frame member for providing interlocking engagement between the walled member and the assembly, and
      iv. a paddlewheel rotatably mounted between a pair of struts extending aft from said frame member for generating a patterned electromagnetic field extending from the paddlewheel forward toward said walled member for sensing by said electromagnetic sensor.

2. The apparatus of claim 1 wherein the walled member includes an aft wall extending between two side walls and wherein said electromagnetic sensor is mounted on the interior aft wall of said member.

3. The apparatus of claim 1 wherein said electromagnetic sensor is mounted on the frame member of the paddlewheel assembly adjacent said rotable paddlewheel.

4. The apparatus of claims 2 or 3 further including a piezoelectric transducer for generating sonic signals to determine depth of objects in the path of said waves mounted within the walled member.

5. The apparatus of claim 1 wherein the walled member includes a pair of guide rails which cooprate with the engagement means on said frame such that when the engagement means are located at a predetermined position on the guide rails, the compressable tabs on the frame member are aligned with locking means on said member.

6. A sensing device for marine vessels comprising:
   (a) a walled mounting member, including bracket means on said member for attaching said member to the exterior of said vessel; with a pair of guide rails on an aft wall of themember and a pair of locking means on said member;
   (b) a paddlewheel assembly for separable mounting on said member comprising:
      i. a pair of struts extending from a frame,
      ii. a pair of compressable tabs extending from said frame, said tabs including projecting means for insertion into said locking means on said member,
      iii. engagement means on said frame member for providing interlocking engagement between the member and the assembly, and
      iv. a paddlewheel rotatably mounted between a pair of struts extending aft from said frame for generating a patterned electromagnetic field proportional to the rotational speed of said paddlewheel as the vessels traverses water said field extending form the paddlewheel toward the member; and
   (c) an electromagnetic sensor responsive to said electromagnetic field for generating an electrcial signal proportional to said rotational speed.

7. The sensing device of claim 6 wherein said electromagnetic sensor is mounted within the walled member on an interior aft wall threof.

8. The sensing device of claim 6 wherein said electromagnetic sensor is mounted on the frame of the paddlewheel assembly adjacent.said rotatable paddlewheel.

9. The sensing device of claims 7 or 8 further including a piezoelectric transducer mounted within the walled member for generating sonic waves below the vessel and sensing the return of said waves from objects encountered by said waves to provide an indication of the depth at which said objects were encountered.

10. The sensing device of claim 6 wherein the locking means pivotably retains the paddlewheel assembly.

11. The sensing device of claims 1 or 6 wherein planar tabs project laterally from the bottom portion of said struts.

* * * * *